United States Patent [19]

Tarumi et al.

[11] Patent Number: 4,562,447

[45] **Date of Patent: * Dec. 31, 1985**

[54] ION MODULATING ELECTRODE

[75] Inventors: Noriyoshi Tarumi, Hachioji; Haruo Iwahashi, Fussa; Masahiko Matsunawa; Hiroshi Tokunaga, both of Hachioji, all of Japan

[73] Assignee: Konishiroku Photo Industry Co., Ltd., Tokyo, Japan

[ * ] Notice: The portion of the term of this patent subsequent to Jan. 17, 2001 has been disclaimed.

[21] Appl. No.: 580,754

[22] Filed: Feb. 17, 1984

Related U.S. Application Data

[63] Continuation of Ser. No. 261,029, May 6, 1981, abandoned.

[30] Foreign Application Priority Data

May 22, 1980 [JP] Japan ................................. 55-68696

[51] Int. Cl.[4] ............................................ G01D 15/06

[52] U.S. Cl. .................................... 346/159; 250/326; 361/230

[58] Field of Search ................ 346/155, 159; 313/207, 313/217, 219–221, 348, 352, 355, 359–361, 5; 315/111.8–111.9; 250/326, 426; 361/229–230

[56] References Cited

U.S. PATENT DOCUMENTS 4,426,654 1/1984 Tarumi et al. ...................... 346/159

*Primary Examiner*—E. A. Goldberg
*Assistant Examiner*—A. Evans
*Attorney, Agent, or Firm*—Jordan B. Bierman

[57] ABSTRACT

An ion modulating electrode having at least one row of a plurality of apertures, which is capable of enhancing or blocking the passage of an ion flow through said apertures. The ion modulating electrode comprises a continuous layer of a conductive material and a segmented layer of a conductive material separated from each other by an insulating layer. The ion modulating electrode comprises at least one of said continuous layer and segmented layer has a resistance layer having a resistivity of not more than $10^{10}$ Ωcm thereon.

4 Claims, 2 Drawing Figures

ION MODULATING ELECTRODE

This application is a continuation of application Ser. No. 261,029, now abandoned, filed 5/6/81.

BACKGROUND OF THE INVENTION

1. Field of the Invention

This invention relates to an ion modulating electrode used as a recording unit in an electrostatic recording method.

2. Description of the Prior Art

Among electrostatic recording methods, a method employing multi-stylus electrodes has been mainly utilized but there is a limit to the quality of an image formed by this method. In an electrostatic recording method employing an ion modulating electrode, charged ink mist is passed through said electrode to form a visible image directly on a recording member. In order to increase the recording speed in the present method, it is necessary to increase the area of the apertures through which the ion flows, by which, however excessive dispersion of the ink mist adversely affects the quality of the image.

The construction and operation of a screen for modulating of an ion flow, an improvement which is provided by the present invention, will be described with reference to FIG. 1. Referring to the drawing, reference numeral 1 denotes an ion generator having a corona wire 12 generally a tungsten wire 40–100 μm in diameter, in an earth plate 11.

Reference numeral 2 denotes an ion modulating electrode showing an example of the construction thereof, in which a first conductive layer of a conductive material 21 and a second conductive layer of a conductive material 22 are separated from each other by an insulating layer 23 with apertures 24 formed just under the corona wire 12. Each of the conductive layers 21, 22 generally comprises a conductive metal, such as copper or aluminum. The insulating layer 23 may consist of an air layer, or an insulating polymer film, such as a polyimide film or a polyester film. In order to apply an ion flow effectively to an electrostatic recording member 3, it is preferable that the conductive layers 21, 22 and insulating layer 23 be thin, specifically, the conductive layers should have thicknesses of not more than 100 μm and the insulating layer should have not more than 200 μm.

The electrostatic recording member 3 comprises a dielectric layer 31 and a backing electrode consists of a conductive layer 32. A high positive voltage is applied between the corona wire 12 and the backing electrode 32 of the electrostatic recording member 3 from a high voltage power source 13. The ion modulating electrode 2 is disposed between the ion generator 1 and the electrostatic recording member 3. The first conductive layer 21 of the electrode 2 is positioned on the side of the ion generator 1 and has a DC bias potential applied to it by a DC power source 25. An ion modulating signal 26 is applied to the second conductive layer 22 to form ion modulating fields in the apertures 24 via an electric field due to a potential difference between the conductive layers 22 and 21, and thereby controlling the passage of the ion flow from the ion generator 1 toward the electrostatic recording member 3. For the above operation, at least one of the conductive layers 21 and 22 need to be segmented.

In order to effectively pass an ion current to the electrostatic recording member 3 through the screen 2, the voltages of the DC power source 25 and voltage signal 26 are maintained for higher than that of the conductive layer 32 of the electrostatic recording member 3, usually by 500–3000 V.

The ion modulating electrode 2 is provided with a row, or a plurality of rows, of electrically separated apertures 24. Ion flow through the apertures 24 to form an electrostatic latent image on the electrostatic recording member 3. The resolution of the electrostatic latent image is determined in accordance with the diameter and pitch of the apertures 24. The apertures 24 are formed by means of laser beams, or by chemical etching. It is said that the density and opening rate of the apertures 24 are preferably 50–500 mesh and not less than 30%, respectively.

Operations for blocking and enhancing the passage of the ion flow will be described.

In an aperture of the electrode 2, a potential of the second conductive layer 22 is kept lower than the potential of the conductive layer 21. Accordingly, an ion enhancing field is produced in the aperture 24 from the first conductive layer 21 to the second conductive layer 22. As a result, the passage of positive ions, which are produced by the ion generator 1, through the mentioned aperture is enhanced, so that the ions reach the surface of the electrostatic recording member 3. In another aperture in the electrode 2, a potential of the second conductive layer 22 is kept higher than the potential of the conductive layer 21. Accordingly, an ion blocking field is produced in said another aperture from the second conductive layer 22 to the first conductive layer 21. As a result, the passage of the positive ions produced by the ion generator 1 through said another aperture is blocked. Thus, electrostatic latent images are formed on the dielectric layer 31. These electrostatic latent images are developed, fixed and visualized by ordinary methods.

In order to effectively direct the ion flow onto the electrostatic recording member 3 it is preferable that distances $d_1$, between the corona wire 12 and the electrode 2, and $d_2$, between the electrode 2 and electrostatic recording member 3, be small. Distance $d_1$ is usually not more than 20 mm, and $d_2$ not more than 5 mm.

In an electrostatic recording method using an ion modulating electrode, the corona wire 12 is disposed close as possible apertures 24 to maximize the recording speed. However, when a corona wire 12 is disposed too close to apertures 24 in a conventional ion modulating electrode, a sparking phenomenon occurs between the corona wire 12 and conductive layer 21, breaking the ion modulating electrode. Therefore, the corona wire 12 cannot be disposed close to the apertures 24, thus limiting the recording speed.

SUMMARY OF THE INVENTION

A primary object of the present invention is to provide an ion modulating electrode which prevents said sparking phenomenon from occurring, enabling the corona wire to be disposed close to apertures in the modulating electrode, increasing the flow rate of the ion flowing toward the electrostatic recording member, and greatly increasing the recording speed.

A secondary object of the present invention is to provide a screen having improved durability and weather resistance.

The above objects can be achieved by an ion modulating electrode having a screen with at least one row of a plurality of apertures, which is capable of enhancing or blocking the passage of an ion flow through the apertures, and which consists of a first layer of a conductive material, an insulating layer and a second layer of a conductive material laminated in the mentioned order; and an ion generator provided on one side of the screen, characterized in that the layer of the conductive material of the electrode which is on the side of the ion generator is provided with a resistance layer thereon which has a resistivity of not more than $10^{10}$ Ωcm.

The above and other objects as well as advantageous features of the invention will become apparent from the following description of the preferred embodiments in conjunction with the accompanying drawing.

DESCRIPTION OF THE PREFERRED EMBODIMENTS

Figure 2:
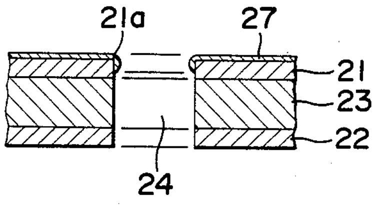
FIG. 2 is a sectional view of the ion modulating device according to the present invention.

FIG. 2 is a sectional view of an ion modulating electrode employed in an embodiment of the present invention, which is provided with a resistance layer 27 on the surface of a continuous layer of a conductive material 21. The resistance layer 27 is formed by spray-coating on the surface of the conductive layer 21, which has been prepared by dispersing conductive powder in a resin binder; or subjecting a metal, such as copper, copper alloy, aluminum, or aluminum alloy, which constitutes a conductive layer, to oxidation. The resistivity of the resistance layer 27 is not more than $10^{10}$ Ωcm. A suitable resistivity of the resistance layer 27 in an ordinary case is $10^{2}$–$10^{8}$ Ωcm. Since the resistance layer 27 is formed for the purpose of preventing the conductive layer 21 from being sparked, it is important that the sharp metallic portion 21*a* at the edge of an aperture 24, which is most liable to be struck by a spark, be covered. When a volume resistivity of the resistance layer 27 is much higher than the above-mentioned value, the ion flow is blocked, so that such a high resistance layer is not desirable. The thickness of the resistance layer 27 may be equal to or smaller than that of the conductive layer.

Examples of the present invention will be described.

EXAMPLE 1

An electrode material consisting of a copper layer of 10 μm in thickness, a polyimide resin layer of 10 μm in thickness and a copper layer of 10 μm was subjected to etching to obtain an ion modulating electrode having apertures. A coating material for use in forming a resistance layer was prepared by using the following substances.

| | |
|---|---|
| Carbon black, "Dia-black #100" (manufactured by Mitsubishi Rayon K.K.) | 1 g |
| Thermosetting acrylic resin, "HR-116" (manufactured by Mitsubishi Rayon K.K.) | 8 g |
| Melamine resin, "J-820" (manufactured by Dainihon Ink K.K.) | 2 g |
| Butyl acetate | 150 cc |

Figure 1:
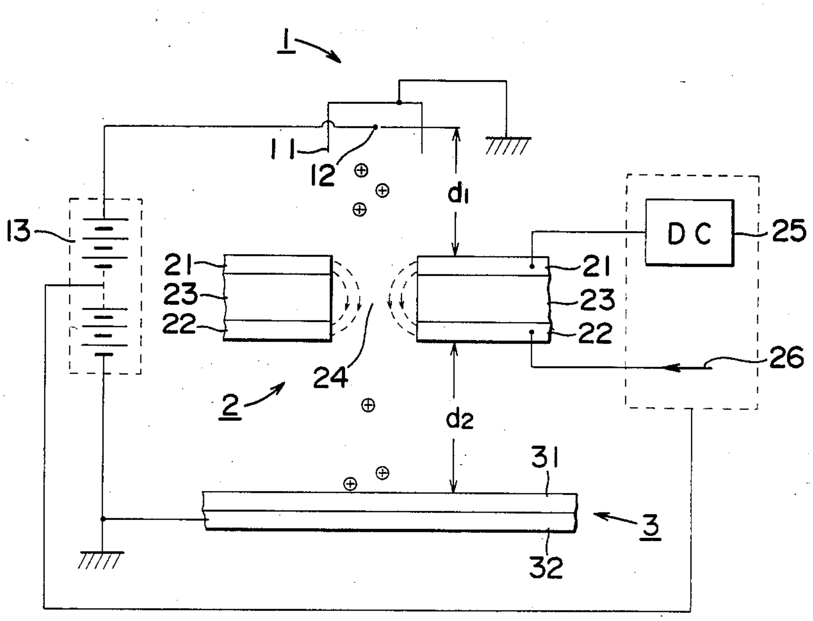
FIG. 1 PRIOR ART
FIG. 1 is a schematic diagram illustrating the construction of an ion modulating device.

The above substances were subjected to dispersion in a ball mill for a whole day and night to obtain a coating liquid. This liquid was coated onto both surfaces of the ion modulating electrode shown FIG. 1 by a spray-coating method. The resulting electrode was dried and then subjected to heat treatment at 150° C. for 30 minutes to obtain a sample of an electrode employed in the present invention. Both of the resistance layers of coating thus formed had thicknesses of 4 μm. Said resistance layers has a resistivity of $10^{5}$ Ωcm. An ion modulating electrode having the same apertures as mentioned above, and not coated with a resistance layer was prepared as a comparative sample. The ion modulating electrode having no resistance layer was set in an ion modulating device, in which an ion generator provided with a 80 μm corona wire was disposed in such a manner that the corona wire was positioned above a row of apertures in the electrode. The corona wire then moved gradually toward the electrode while applying a high voltage of 8 KV between the corona wire and the electrode. As a result, a spark occurred when the distance between the corona wire and the electrode was shortened to 5 mm. A similar experiment was conducted with the sample of an electrode employed in the present invention. No spark occurred even when the corona wire was brought as close as 2 mm to the sample.

EXAMPLE 2

A lamination consisting of a layer of aluminum 35 μm thick, a layer of polyimide resin 25 μm thick and a layer of aluminum 35 μm thick was subjected to photoetching and a laser processing to form apertures therein. The ion modulating electrode thus obtained was then subjected to anodic oxidation using oxalic acid to form an oxide film 5 μm thick on the aluminum layer of the electrode. As a result, a sample of an ion modulating electrode employed in the present invention, which has a resistance layer consisting of the oxide film, was obtained. Said resistance layer has a resistivity of $10^{3}$ Ωcm. The same ion modulating electrode as mentioned above but not subjected to a surface oxidation treatment was prepared as a comparative sample. These samples were tested in the same manner as in Example 1. When the corona wire was brought to 5 mm from the comparative sample, a spark occurred. However, when the corona wire was brought close to the sample of the present invention, no spark occurred even when the corona wire was only 2 mm from the sample.

When the samples of screens of the present invention, which were described in Examples 1 and 2, were used, the recording speed was greatly improved. It was also ascertained that the electrodes of the present invention have a remarkably improved durability and weather resistance.

The present invention is not, of course, limited to the above emobodiment; it may be modified in various ways within the scope of the appended claims.

What is claimed is:

1. An electrostatic recording device comprising an ion generator, an electrostatic record medium and an ion modulating electrode between said ion generator and said record medium having at least one row of a plurality of apertures, which is capable of enhancing or blocking the passage of an ion flow through said apertures, and which comprises a continuous layer of a conductive material and a segmented layer of a conductive material, wherein said continuous layer and segmented layer are separated from each other by an insulating layer and have applied thereto selected voltages for modulating the ion flow, said ion modulating electrode having at least one of said continuous layer and segmented layer which is adjacent said ion generator provided with a resistance layer having a resistivity of from $10^2$ to $10^8$ Ωcm thereon, said resistance layer being formed so as to extend over said one layer of conductive material onto the edges around said plurality of apertures for preventing sparking between said ion generator and said one layer.

2. An electrostatic recording device according to claim 1, wherein said resistance layer is provided on said continuous layer.

3. An electrostatic recording device according to claim 1, wherein said resistance layer is provided on said continuous layer and segmented layer.

4. An electrostatic recording device according to claims 1, 2 or 3, wherein said one layer is arranged less than 5 mm from said ion generator.

* * * * *